United States Patent Office 3,140,916
Patented July 14, 1964

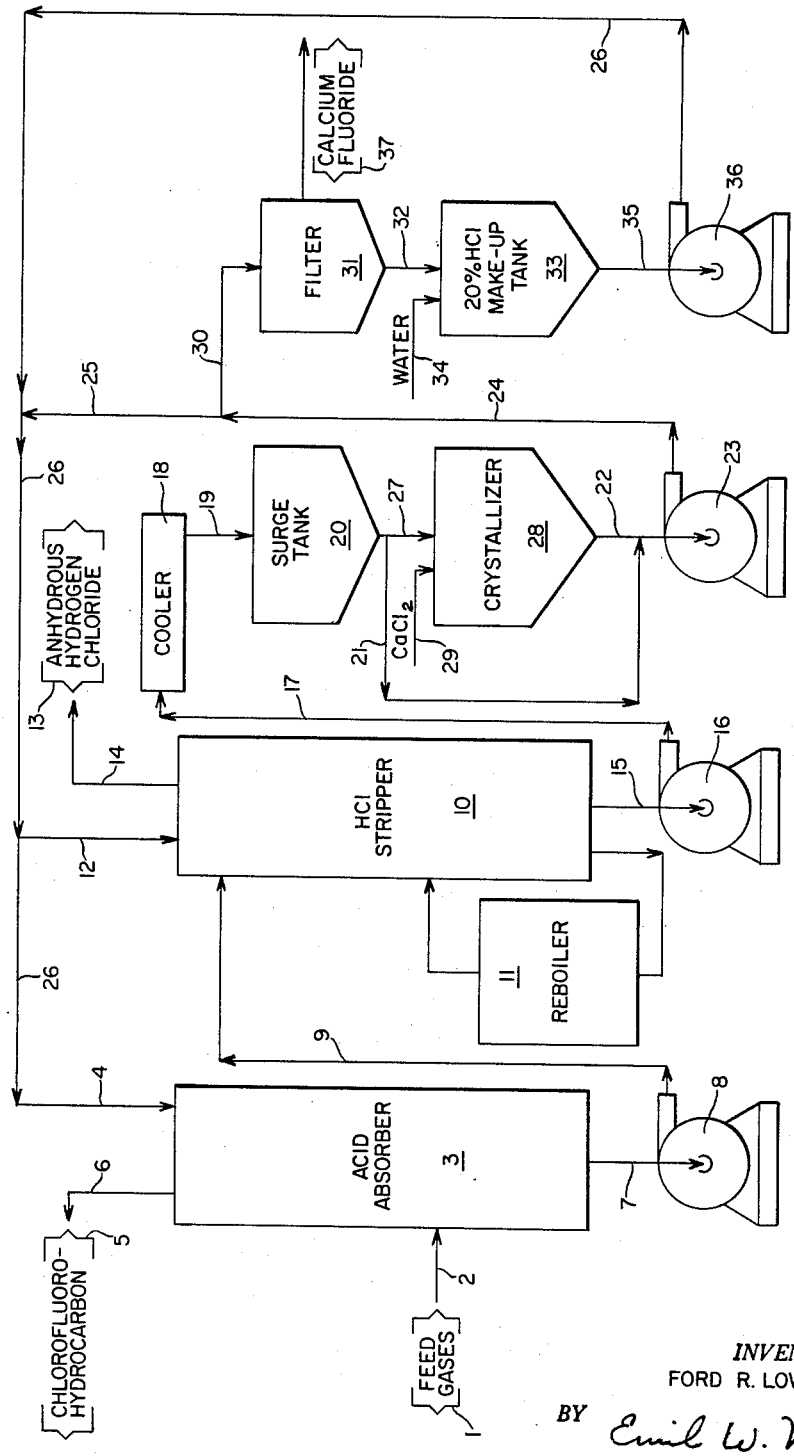

3,140,916
HYDROGEN CHLORIDE RECOVERY AND PURIFICATION FROM GASES CONTAINING HYDROGEN FLUORIDE
Ford R. Lowdermilk, Gwynedd Valley, Pa., assignor to Pennsalt Chemicals Corporation, Philadelphia, Pa., a corporation of Pennsylvania
Filed Apr. 10, 1961, Ser. No. 101,932
6 Claims. (Cl. 23—154)

This invention relates to the recovery of anhydrous hydrogen chloride from hydrogen chloride contaminated with hydrogen fluoride. In one preferred aspect, this invention is directed to a combined absorption, stripping, crystallization and separation process whereby hydrogen fluoride-contaminated hydrogen chloride present in product gases from a chlorofluorohydrocarbon production process is recovered in anhydrous form substantially free of hydrogen fluoride and the hydrogen fluoride is recovered in the form of readily filterable calcium fluoride crystals.

Hydrogen chloride containing varying amounts of unreacted hydrogen fluoride as a contaminant is produced as a by-product in many processes in which hydrogen fluoride is used as a fluorinating agent, such as the conversion of a chlorine-containing organic compound to a fluorine-containing compound. Thus, in the production from chlorinated starting materials of chlorofluorohydrocarbons, e.g. halomethanes, haloethanes, halopropanes, and halobutanes, especially those used for refrigeration and in pressurized containers for dispensing purposes, large quantities of such by-product hydrogen chloride are formed. This by-product hydrogen chloride represents a significant potential economic loss because of the presence in it of small but nevertheless objectionable amounts of the hydrogen fluoride, which makes the hydrogen chloride undesirable for use in many industrial applications where hydrogen chloride or muriatic acid normally find use.

In patent and other technical literature, various processes have been disclosed which are directed, with varying degrees of success, to the removal of the contaminant hydrogen fluoride from the by-product hydrogen chloride in order to render the hydrogen chloride commercially useful. The processes include, for example, selective adsorption of hydrogen fluoride from the hydrogen chloride by use of alumina, the subjecting of a solution of the acids to a variety of distillation procedures, or the contacting of the gases over successive solid reactant masses, e.g. silica, boric acid, or bases.

The process of the present invention is especially directed to a by-product hydrogen chloride containing hydrogen fluoride in minor amounts such that it is more economical to recover the hydrogen chloride as the principal product than to recover the hydrogen fluoride itself. The process is preferably applied to by-product hydrogen chloride containing under about 10% of hydrogen fluoride.

As applied to the recovery of hydrogen chloride from a chlorofluorohydrocarbon production process, the present invention comprises a continuous multi-step process for recovery of anhydrous hydrogen chloride whereby the product gases from such a process are initially continuously scrubbed with a dilute solution of hydrochloric acid to absorb substantially all the hydrogen fluoride and hydrogen chloride from the product gases. The scrubbing solution is allowed to become enriched, preferably close to saturation, with hydrogen chloride in the absorber. The solution is then continuously fed to a heated stripping tower from which is recovered, as overhead product, anhydrous hydrogen chloride of commercially acceptable quality, i.e. containing about 0.02 to 0.3% of hydrogen fluoride by weight, depending on operating conditions in the stripper. Hydrogen fluoride accumulates in the stripper bottoms product. This bottoms product contains about 18–21% of hydrogen chloride and about 0.75–5% or more of hydrogen fluoride. The hydrogen fluoride content of the bottoms product is allowed to build up in excess of about 1% hydrogen fluoride, preferably to at least about 3%. The bottoms product then is cooled to a temperature above about 55° C., preferably in the range 55°–85° C. It is then treated with calcium chloride, preferably in the form of a saturated solution, to form calcium fluoride by metathesis of the calcium chloride with the hydrogen fluoride. The amount of calcium chloride used is such that while much of the hydrogen fluoride present in the bottoms product is converted to calcium fluoride, an amount of hydrogen fluoride equivalent to not less than about 1% by weight of the still bottoms product is left unconverted. Filterable calcium fluoride crystals form and are removed from the mother liquor by physical means, e.g. filtration. The crystals are washed with water and recovered as a valuable by-product. The hydrochloric acid filtrate is tested for hydrogen chloride content, and, if necessary, diluted with water, to bring its hydrogen chloride content to about 20% by weight. Addition of water is sometimes found necessary in order to make up for water loss which may occur from the system, particularly in removal of the calcium fluoride crystals. The dilute hydrogen chloride solution, containing about 0.75–1.0% of hydrogen fluoride by weight and substantially free of calcium ions is recycled to the absorber and stripper units for use as the scrubbing solution therein.

The process of the present invention permits the continuous, large-scale recovery of substantially all the stripper bottoms product in the form of hydrogen chloride and filterable calcium fluoride. The process is especially useful when the hydrogen fluoride content of the stripper bottoms is relatively high, i.e. 3–5% by weight. In contrast to the prior art processes, the present process results in the precipitation and recovery of calcium fluoride essentially in a filterable crystalline form. I have found that when sufficient calcium chloride is used to metathesize completely all the hydrogen fluoride present, and when an excess of calcium ions is circulated in the hydrochloric acid scrubbing solution, deposits of gelatinous and unfilterable calcium fluoride form in the scrubber, stripper and transfer lines, thereby seriously impairing fluid flows and heat transfer. By means of my invention formation of gelatinous and unfilterable calcium fluoride in the hydrochloric acid is avoided and the acid is freely recycled to the acid scrubber unit and to the stripper where the hydrogen chloride content is eventually recovered as anhydrous, hydrogen fluoride-free hydrogen chloride.

The following detailed description and the accompanying diagrammatic drawing are illustrative of one embodiment of the invention.

In the drawing, a mixture of feed gases 1, representing the effluent gas stream from a chlorofluorohydrocarbon production process, is fed through line 2 to an acid absorber 3, maintained at about atmospheric pressure. A dilute hydrochloric acid scrubbing solution enters the absorber through line 4. Chlorofluorohydrocarbon gases 5, scrubbed substantially free of inorganic acids, leave the absorber through line 6. The scrubbing solution, enriched in hydrogen chloride and hydrogen fluoride, leaves the absorber 3 through line 7 and is transferred by pump 8 through line 9 to a hydrogen chloride stripper 10 heated by a reboiler 11. A stream of the dilute scrubbing solution is also fed to the top of the stripper 10 through line 12. Anhydrous hydrogen chloride of commercially acceptable quality 13 leaves the stripper through line 14.

A stripper bottoms hydrochloric acid product reduced in hydrogen chloride but enriched in hydrogen fluoride content leaves the stripper through line 15 and is transferred by pump 16 through line 17 to a cooler 18. The cooled bottoms product leaves the cooler 18 through line 19 and accumulates in surge tank 20. From the surge tank 20, the bottoms product is taken initially through line 21 to line 22 and through line 22 to pump 23. It is then transferred through lines 24 and 25 to line 26 and through line 26 to lines 4 and 12. When the hydrogen fluoride content of the stripper bottoms reaches about 1.1–3% by weight, a portion of the bottoms stream from surge tank 20 is fed continuously through line 27 to a crystallizer 28. Calcium chloride in the form of a substantially saturated solution is fed continuously through line 29 to said crystallizer to metathesize a portion of the hydrogen fluoride in the stripper bottoms stream to calcium fluoride. The ratio of calcium chloride to stripper bottoms is maintained such that the hydrogen fluoride content of the stripper bottoms leaving the crystallizer is about but not less than 1% by weight. The rate of fluid flow through the crystallizer is kept such that the mother liquor in the effluent stream is substantially free of calcium ions. Crystals of calcium fluoride form rapidly in the mother liquor in the crystallizer and are carried from the crystallizer along with the mother liquor through line 22 where the effluent stream from the crystallizer mixes with the remaining portion of the stripper bottoms stream coming from the surge tank 20 through line 21. The mixed stream is pumped by means of pump 23 through lines 24 and 30 to a filter 31. Line 25 is closed when this step of the operation begins and is kept closed so long as crystallizer effluent is present in line 24, so that crystals of calcium fluoride are not pumped to the stripper and absorber unit. The filtrate from the filter 31 leaves through line 32 and passes into a make-up tank 33 where it is adjusted to make an about 20% hydrogen chloride by weight hydrochloric acid solution by addition of water, as needed, from line 34. The dilute hydrochloric acid solution containing about 1% of hydrogen fluoride by weight, is fed through line 35 to pump 36 and pumped through line 26 to lines 4 and 12. The calcium fluoride filter cake 37 is removed from the filter 31 and recovered.

After the system is functioning in equilibrium, the charge of feed gases is maintained constant and by means of the process of this invention is continuously separated into nearly acid-free organic gases, substantially hydrogen fluoride-free anhydrous hydrogen chloride, and crystalline calcium fluoride.

In accordance with this invention, it has been found that the metathesis of the hydrogen fluoride in the manner described is critical for the crystallization of calcium fluoride rapidly in a readily filterable form in which it is removable from the recycling hydrochloric acid scrubbing solution in a part of the system away from the absorber and stripper units so that no fouling of any of the processing equipment occurs. The significance of this improvement may be appreciated from the fact that calcium fluoride is known to form finely crystalline suspensions and in some cases to settle only as gelatinous masses from solutions. By practice of the crystallization step in accordance with the invention, the calcium fluoride is precipitated from the acid mother liquor in plate-like crystals which settle relatively rapidly and are easily separated from the mother liquid.

The temperature for the crystallization step has been found to be critical, especially for continuous operation of the process. Thus, at temperatures below about 55° C., e.g. at 25° C., calcium fluoride is found to settle over a period of hours as a very fine crystalline material from a $CaCl_2$—$CaF_2$—$HCl$—$H_2O$ system. Surprisingly, at 55°–85° C. the calcium fluoride is found to form as large plate-like crystals which settle quickly and permit rapid filtration of the mass.

It was found further that by treating a hydrogen fluoride-containing hydrochloric acid solution with less than the stoichiometric amount of calcium chloride required to metathesize all the hydrogen fluoride to calcium fluoride that the calcium ion concentration of the treated hydrochloric acid liquid is rapidly reduced nearly to zero. This fact is important for the reason that no significant precipitation of calcium fluoride will occur from the acid solution when more hydrogen fluoride is added to it in the acid absorber.

Combining the foregoing step of using a critical temperature range for rapid, filterable crystal formation with the step of using a deficiency of calcium chloride in the metathesis step, there is provided a means which, in conjunction with the previously known steps of absorption and stripping of hydrochloric acid, results in a process which permits continuous recovery of substantially all the hydrogen chloride and hydrogen fluoride values from the feed gases in the form of commercially useful products without fouling of the process equipment with unfilterable crystalline or gelatinous materials.

The amount of calcium chloride to be used for the metathesis step can be readily determined by known analytical control means. In practicing the process, an amount of calcium chloride is used which is less than the stoichiometric amount required for the equation $$CaCl_2 + 2HF \rightarrow CaF_2 + 2HCl$$

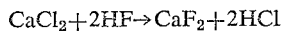

Preferably, the amount used is such that the hydrogen fluoride is kept at a minimum content of at least 1% by weight of the treated solution, thus ensuring substantial precipitation of all the calcium fluoride formed and freedom from calcium ions in the mother liquor leaving the crystallizer.

Some minute amounts of calcium fluoride may remain in solution in the recycled scrubbing solution if adequate time is not allowed for crystallization. However, while it is known that the solubility of calcium fluoride in aqueous solution does not change appreciably with temperature, such dissolved minute amounts of calcium fluoride do not present a problem in the absorber and stripper units, since the heat of absorption in the absorber and the additional heat introduced by the reboiler of the stripper serve adequately to keep the small amount of calcium fluoride substantially all in solution even when the acid content of the scrubbing solution approaches saturation. Therefore, no harmful precipitation of calcium fluoride takes place in the process system beyond the crystallizer unit.

The following example further illustrates the invention.

*Example*

The gaseous product mixture from a production reactor wherein carbon tetrachloride is catalytically reacted with hydrogen fluoride to form trichloromonofluoromethane and dichlorodifluoromethane and containing in addition to such products about 25% hydrogen chloride and about 0.5% hydrogen fluoride by weight is fed to an acid absorber unit. In the absorber, the gaseous mixture is contacted with a recycled hydrochloric acid scrubbing solution initially containing about 20% hydrogen chloride by weight. The flow rates of the gaseous mixture and the scrubbing solution are maintained at a rate such that the gaseous mixture is washed substantially free of hydrogen chloride and hydrogen fluoride by the scrubbing solution and the solution leaving the absorber is substantially saturated with said hydrogen halides. The scrubbed organic gases leave the scrubber as an overhead product containing about 1% of hydrogen chloride.

The saturated scrubbing solution from the absorber is charged to a hydrogen chloride stripper column which is operated at a bottom temperature of about 110 C. and an overhead temperature of about 30° C. A small stream of the same hydrochloric acid scrubbing solution as that used in the absorber unit is fed to the top of the stripper column to scrub the overhead hydrogen chloride product, which is substantially anhydrous and hydrogen fluoride-free. The recovered hydrogen chloride analyzes about 99.0% hydrogen chloride and 0.02%–0.3% hydrogen fluoride, with the remainder being water.

The stripper bottoms product initially contains about 18–21% hydrogen chloride and about 0.75–1.0% hydrogen fluoride by weight. This bottoms product is cooled to about 55° C. and is intially recycled directly to the absorber and stripper units as the scrubbing solution. The recycling and stripping processes are continued until the acid content of the stripper bottoms is about 18–20% hydrogen chloride and about 3.0% hydrogen fluoride by weight.

The bottoms product is then diverted, after cooling to about 55° C. to a vessel serving as a reactor and crystallizer. In said vessel, a nearly saturated calcium chloride solution is added to the bottoms product in such amount that the hydrogen fluoride content of the mass is reduced to, but not below, about 1% by weight by metathesis with the calcium chloride. Large plate-like crystals of calcium fluoride form rapidly from the mother liquor.

The mass is held in the crystallizer for a period sufficient to ensure that the effluent mother liquor is reduced to and maintained substantially free of calcium ion content. The mass is then pumped through a filter to remove the calcium fluoride crystals. The crystals are washed with water and recovered. The filtrate is diluted with sufficient water to make up for that lost in the stripping, crystallization and filtering operations and to bring the hydrogen chloride content of the filtrate to about 20% by weight. The filtrate is then recycled as dilute hydrochloric acid scrubbing solution the absorber and stripper units.

The above described embodiments of the invention are presented for the purpose of illustration. It is to be understood that the invention can be practiced by different embodiments without departing from the spirit and scope thereof and that the invention is not intended to be limited by the above specific embodiments.

I claim:

1. A continuous process for recovery of substantially pure anhydrous hydrogen chloride from a gaseous mixture containing a substantial portion of hydrogen chloride and a relatively small amount of hydrogen fluoride, which comprises scrubbing said mixture in an acid absorber with a recycled stream of dilute hydrochloric acid scrubbing solution to form a substantially saturated aqueous acid solution, passing said latter acid solution through a heated stripper from which a portion of the acid is recovered as an overhead product in the form of substantially anhydrous, hydrogen fluoride-free hydrogen chloride and the remaining portion is removes as stripper bottoms product containing hydrogen fluoride, reacting the hydrogen fluoride in said bottoms product in a separate vessel at a temperature of at least 55° C. with sufficiently less than a stoichiometric amount of calcium chloride so that the hydrogen fluoride content of the bottoms product after reaction with said calcium chloride is not reduced below about 1.0% by weight of the reacted bottoms product, thereby causing precipitation of crystals of calcium fluoride in filterable form from said reacted bottoms product, separating said crystals from the mother liquor by filtering, and recycling a portion of said mother liquor to the absorber.

2. The process of claim 1 in which the stripper bottoms product contains from about 1.1% to about 5% by weight of hydrogen fluoride.

3. The process according to claim 1 in which the stripper bottoms product is treated with calcium chloride at a temperature in the range of about 55° C. to about 85° C.

4. A continuous process for recovery of substantially pure anhydrous hydrogen chloride from a gaseous mixture consisting of the product stream from a chlorofluorohydrocarbon production process, said stream containing a substantial portion of hydrogen chloride and a relatively smaller portion of hydrogen fluoride, which comprises scrubbing said mixture in an acid absorber with a recycled stream of dilute hydrochloric acid scrubbing solution to form a close to saturated aqueous acid solution while continuously removing said chlorofluorohydrocarbon from the absorber, passing said latter acid solution through a heated stripper from which a portion of the acid is recovered as an overhead product in the form of substantially anhydrous, hydrogen fluoride-free hydrogen chloride and the remaining portion is removed as stripper bottoms product containing hydrogen fluoride, reacting the hydrogen fluoride in said bottoms product in a separate vessel at a temperature of at least 55° C. with sufficiently less than a stoichiometric amount of calcium chloride so that the hydrogen fluoride content of the bottoms product after reaction with said calcium chloride is not reduced below about 1.0% by weight of the reacted bottoms product, thereby causing precipitation of crystals of calcium fluoride in filterable form from said reacted bottoms product, separating said crystals from the mother liquor by filtering, and recycling a portion of said mother liquor to the absorber.

5. The process of claim 4 in which the stripper bottoms product contains from about 1.1% to about 5% by weight of hydrogen fluoride.

6. The process according to claim 4 in which the stripper bottoms product is treated with calcium chloride at a temperature in the range of about 55° C. to about 85° C.

References Cited in the file of this patent

UNITED STATES PATENTS 1,329,072    Chase _____ Jan. 27, 1920

FOREIGN PATENTS 822,494    Great Britain _____ Oct. 28, 1959
823,677    Great Britain _____ Nov. 18, 1959